United States Patent
Hou et al.

(10) Patent No.: US 9,047,653 B2
(45) Date of Patent: Jun. 2, 2015

(54) STITCHED DIGITAL IMAGES

(75) Inventors: Hui-Man Hou, Beijing (CN); Jian-Ming Jin, Beijing (CN); Yuhong Xiong, Beijing (CN)

(73) Assignee: Hewlett-Packard Development Company, L.P., Houston, TX (US)

( * ) Notice: Subject to any disclaimer, the term of this patent is extended or adjusted under 35 U.S.C. 154(b) by 210 days.

(21) Appl. No.: 13/818,460

(22) PCT Filed: Aug. 24, 2010

(86) PCT No.: PCT/CN2010/076286
§ 371 (c)(1),
(2), (4) Date: May 15, 2013

(87) PCT Pub. No.: WO2012/024830
PCT Pub. Date: Mar. 1, 2012

(65) Prior Publication Data
US 2013/0223758 A1    Aug. 29, 2013

(51) Int. Cl.
*G06K 9/40*    (2006.01)
*G06T 5/00*    (2006.01)
(Continued)

(52) U.S. Cl.
CPC ............... *G06T 5/00* (2013.01); *G06T 3/4038* (2013.01); *G06T 5/50* (2013.01); *G06T 2207/20221* (2013.01)

(58) Field of Classification Search
CPC ....... G06K 9/00; G06K 9/00449; G06K 9/34; G06K 9/342; G06K 9/4604; G06K 2209/2045; G06T 3/4038; G06T 5/002; G06T 5/008; G06T 5/23238; G06T 5/50; G06T 7/0024; G06T 7/0028; G06T 7/0075; G06T 7/0079; G06T 7/0081; G06T 7/0083; G06T 11/00; G06T 11/60; G06T 15/503; G06T 2200/32; G06T 2207/10148; G06T 2207/20016; G06T 2207/20104; G06T 2207/20144; G06T 2207/20221; H04N 1/1903; H04N 1/195; H04N 1/19584; H04N 1/19594; H04N 1/387; H04N 1/3876; H04N 5/23238; H04N 5/2624; H04N 5/272; H04N 7/142; H04N 2201/0436; G06F 3/04845; G06F 3/1446; G09G 2300/026; G09G 2310/0232; G09G 2340/10; G09G 2340/16; G03B 37/00
See application file for complete search history.

(56) References Cited

U.S. PATENT DOCUMENTS

| 6,331,860 B1 | 12/2001 | Knox |
| 6,493,469 B1 | 12/2002 | Taylor et al. |
| 7,450,137 B2 | 11/2008 | Deng et al. |

(Continued)

FOREIGN PATENT DOCUMENTS

CN    1954590 A    4/2007

OTHER PUBLICATIONS

Liang, Jian et al, "Mosaicing of Camera-Captured Documents without Pose Restriction", 2006.
(Continued)

*Primary Examiner* — Jose Couso
(74) *Attorney, Agent, or Firm* — Shanghai Patent & Trademark Law

(57) ABSTRACT

Disclosed is a method of blending stitched document image portions. The method identifies background pixels and foreground pixels on each boundary of the image portions. Pixels of the image portions are then modified based on a pixel value difference between corresponding background pixels on the respective boundary of the first and second portions.

19 Claims, 15 Drawing Sheets

(51) Int. Cl.
*G06T 3/40* (2006.01)
*G06T 5/50* (2006.01)

(56) References Cited

U.S. PATENT DOCUMENTS

| 7,532,770 | B2 | 5/2009 | Pfister |
| 7,606,441 | B2 * | 10/2009 | Ouchi ............ 382/294 |
| 7,613,363 | B2 | 11/2009 | Platt et al. |
| 7,894,689 | B2 * | 2/2011 | Liu et al. ............ 382/284 |
| 8,098,956 | B2 * | 1/2012 | Tatke et al. ............ 382/284 |
| 8,345,961 | B2 * | 1/2013 | Li et al. ............ 382/154 |
| 2008/0199082 | A1 | 8/2008 | Tanaka et al. |
| 2009/0022422 | A1 | 1/2009 | Sorek et al. |
| 2009/0129700 | A1 | 5/2009 | Rother et al. |

OTHER PUBLICATIONS

Szeliski, Richard "Image Alignment and Stitching".
Zomet, Assaf et al. "Seamless Image Stitching by Minimizing False Edges", IEEE Trans in Image Processing, Research Paper.

\* cited by examiner

STITCHED DIGITAL IMAGES

BACKGROUND

Digital image stitching is the process of combining multiple digital images with overlapping parts or adjacent edges to produce a single stitched digital image from the multiple digital images.

If the multiple digital images have been acquired in different lighting conditions, for example, visually perceivable seams may occur at the boundary between stitched images. Such visually perceivable seams may reduce the visual appeal of the stitched images.

Known methods for blending stitched images to reduce visually perceivable seams are computationally intensive and unsuitable for high performance applications.

BRIEF DESCRIPTION OF THE EMBODIMENTS

Embodiments are described in more detail and by way of non-limiting examples with reference to the accompanying drawings, wherein FIG. 1 depicts an example system for blending a stitched digital image:

FIG. 12 depicts a stitched digital image created from the four captured images of FIG. 8;

FIG. 13 depicts a stitched digital image created from the four captured images of FIG. 8, wherein the image has also been blended according to an embodiment.

DETAILED DESCRIPTION

Figure 1:
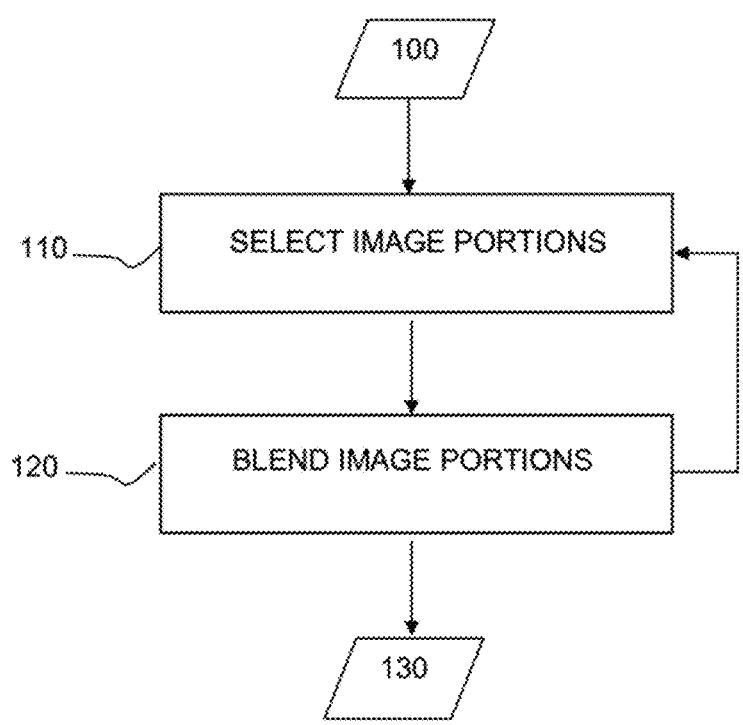

It should be understood that the Figures are merely schematic and are not drawn to scale. It should also be understood that the same reference numerals are used throughout the Figures to indicate the same or similar parts.

If the multiple digital images have been acquired in different lighting conditions, for example, visually perceivable seams may occur at the boundary between stitched images. It may therefore be desirable to reduce or eliminate such visually perceivable seams between the stitched images so as to produce a more visually appealing stitched image.

There is proposed an approach to blending stitched digital images to produce a more visually appealing image.

Embodiments take advantage of characteristics of digital images of documents by noting that the pixels of a digital document image can be categorized into two categories; background pixels, which represent an area of the document devoid of document content (such as a blank area of a document); and foreground pixels, which represent an area comprising document content (such as text or an image). By treating background pixels differently from foreground pixels, embodiments may generate blended or seamless stitched digital document images in an efficient manner. Such an approach exploits the finding that human eyes may be more sensitive to the changes in document background pixels than foreground pixels.

Embodiments provide a method of blending stitched document image portions to provide a single document image having reduced or eliminated seams between the stitched images. In such an embodiment, background pixels and foreground pixels on a boundary between the stitched images are firstly identified, and then pixels are treated to a blending process based on the difference between background pixels on the boundary. The background pixels on the boundary may be those nearest to the pixel being modified.

Pixels of the image portions may be subjected to a blending process wherein background pixels and foreground pixels are treated differently.

According to an embodiment, there is provided a method of blending first and second portions of a stitched digital image of a document, the method comprising the steps of: using a computer, detecting respective overlapping or adjacent boundaries of the first and second portions; using a computer, categorizing pixels on each boundary of the first and second portions as either a background pixel or a foreground pixel; and using a computer, modifying a pixel of the first or second portion based on a pixel value difference between corresponding background pixels on the respective boundary of the first and second portions.

The proposed approach may blend aligned or stitched image portions without requiring the image portions to overlap.

In embodiments, the step of categorizing pixels may be based on a comparison of the brightness and saturation of neighboring pixels with a threshold value.

FIG. 1 depicts a system according to an embodiment. An input dispatcher 110 is adapted to receive a digital stitched image 100 of a document as an input. The digital stitched image comprises a plurality (N) of digital image portions, wherein each digital image portion is a captured representation of a different portion of the document, and wherein the N digital image portions are stitched together (either adjacent or overlapping each other) to form a single digital stitched image of the document.

The input dispatcher 110 selects first I0 and second I1 digital image portions having overlapped or adjoining edges and outputs the selected digital image portions I0 and I1 to a blending unit 120.

Any suitable method may be used by the input dispatcher 110 to select the first I0 and second I1 digital image portions. For example, the digital image portions may be selected according to their position in the digital stitched image 100 (from top to bottom and left to right), their total combined area, or even randomly.

The blending unit 120 undertakes a blending process to reduce or eliminate visually perceivable seams that may exist between the first I0 and second I1 digital image portions. The blended two image portions (I0 and I1) are then combined and output to the input dispatcher as a new digital image portion for future blending.

This process of selecting first and second image portions and blending is then repeated (N−1 times) until a single image portion remains and forms a single, blended digital stitched image of the document. The single, blended digital image 130 is output from the blending unit 120.

Here, the system has separate units for selecting and blending the digital image portions. Alternative examples may combine these units so that a single processing unit undertakes the selection and blending of digital image portions.

Figure 2:
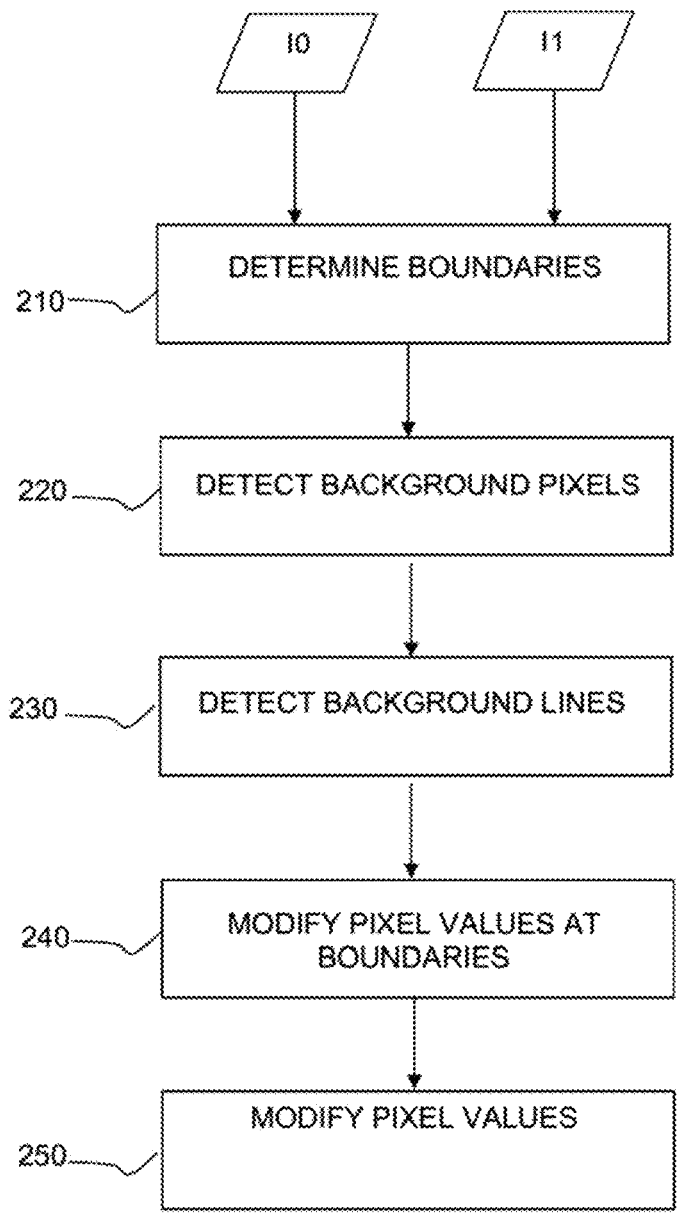
FIG. 2 is a flow diagram of a blending method according to an embodiment.

A flow diagram of a blending process according to an embodiment is shown in FIG. 2.

Figure 3A:
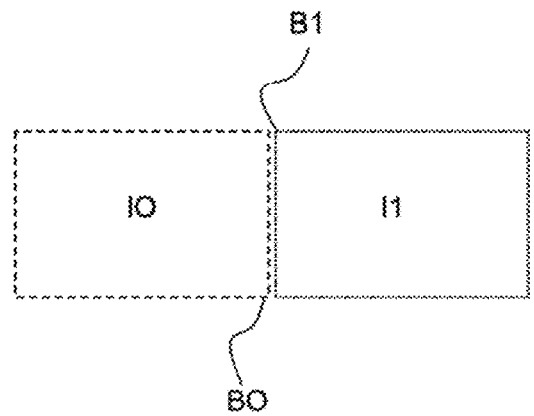
FIGS. 3A and 3B depict adjacent and overlapping image portions, respectively.

In the first step 210, the boundary between first I0 and second I1 image portions of a stitched digital image is determined. Referring to FIG. 3A, a boundary between first I0 and second I1 image portions comprises first B0 and second B1 boundaries. The first boundary B0 is the boundary of the first image portion I0 where pixels of the first image portion 10 are adjacent to the second image portion I1, and the second boundary B1 is the boundary of the second image portion I1 where the pixels of the second image portion I1 are adjacent to first image portion I0.

Figure 3B:
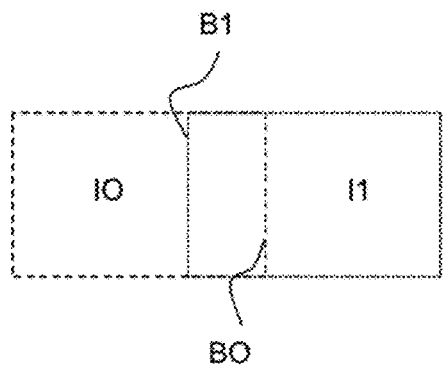

If the two input image portions I0 and I1 are overlapped (as shown in FIG. 3B), the first B0 and second B1 boundaries can be determined by various known methods: any straight line in the overlapped part, or a straight line which contains most background pixels. For example, as shown in FIG. 3B, all the pixels' values in a vertical line of the overlapped area can be added together and form a histogram, the peak location in the histogram can be chosen as the boundary.

The method then continues to step 220 in which the pixels of the input image patches I0 and I1 are categorized into one of two different types: background pixels representing an area of the document devoid of document content; and foreground pixels representing an area comprising document content. Here, the categorization is undertaken by analyzing the brightness and saturation of pixels.

By way of example, when one denotes P0 as a pixel on the first boundary B0, and P1 as P0's neighboring pixel on the second boundary B1, the brightness value (I component in the HIS color model) and saturation value (S component in the HIS colour model) of both pixels can be examined against threshold values TH_B and TH_S, respectively. If the brightness value I of both pixels P0 and P1 are greater than TH_B and the saturation value S are less than TH_S, they are categorized to background pixels. Otherwise, the pixels P0 and P1 are categorized as foreground pixels.

Figure 4:
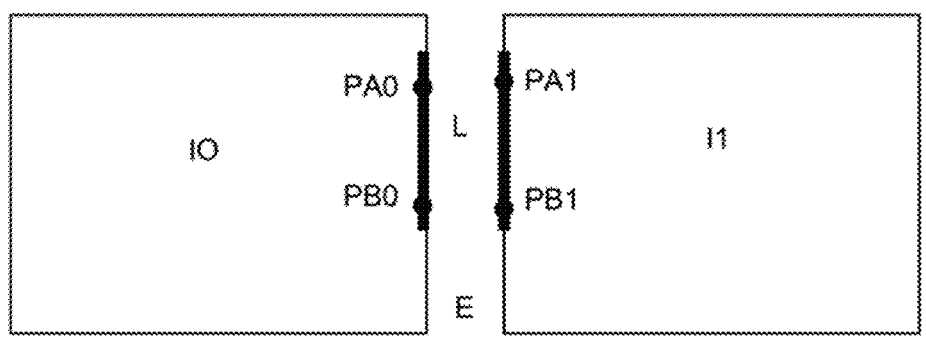
FIG. 4 depicts background lines on first and second boundaries.

Next, in step 230, background lines on the first B0 and second B1 boundaries are detected. Referring to FIG. 4, a background line is a continuous series of background pixels along the first B0 or second B1 boundary. For example, where PA0 and PB0 are two pixels on the first boundary B0, and PA1 and PB1 are the corresponding neighbouring pixels on the second boundary B1, if the brightness value of PA0 is greater than or equal to PA1, the brightness value of PB0 must also be greater than or equal to PB1 for a background line to exist at the boundary. Similarly, if the brightness value of PA0 is less than or equal to PA1, then the brightness value of PB0 must be less than or equal to PB1 for a background line to exist at the boundary. Where such conditions are not met, the boundary is segmented at the pixels which do not satisfy the conditions. This may ensure each background line has the same brightness gradient direction from B0 to B1.

Also, all detected background lines with a length that is smaller than a threshold length value TH-L may be filtered out or disregarded (as noise, for example).

Figure 5A:
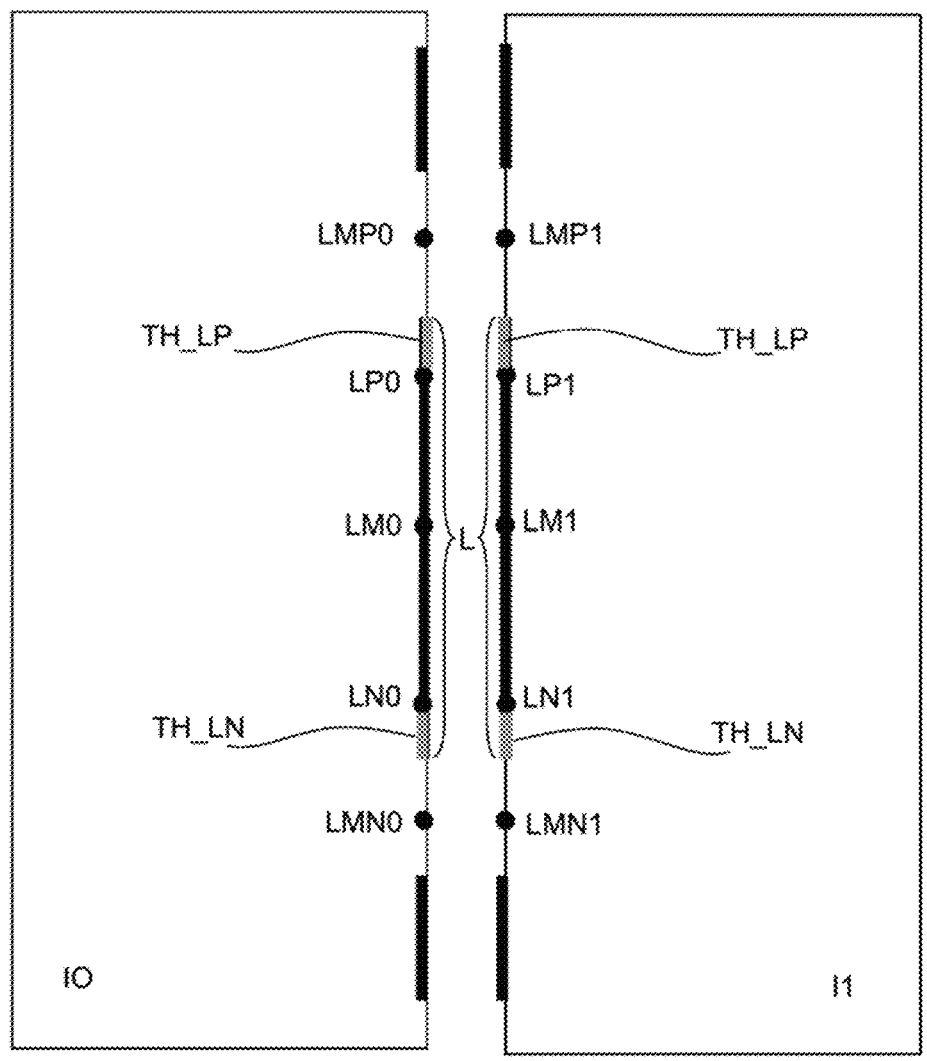
FIGS. 5A to 5C depict examples of background lines on first and second boundaries.
Figure 5B:
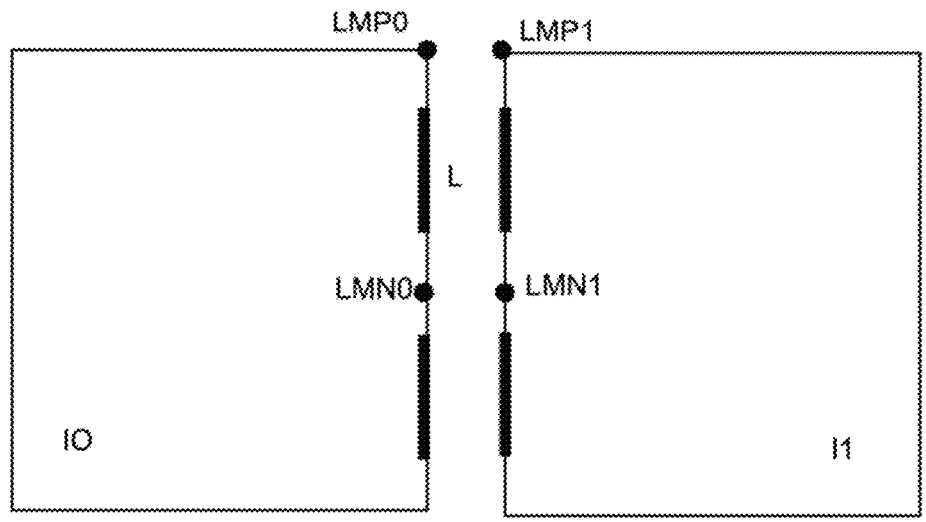
Figure 5C:
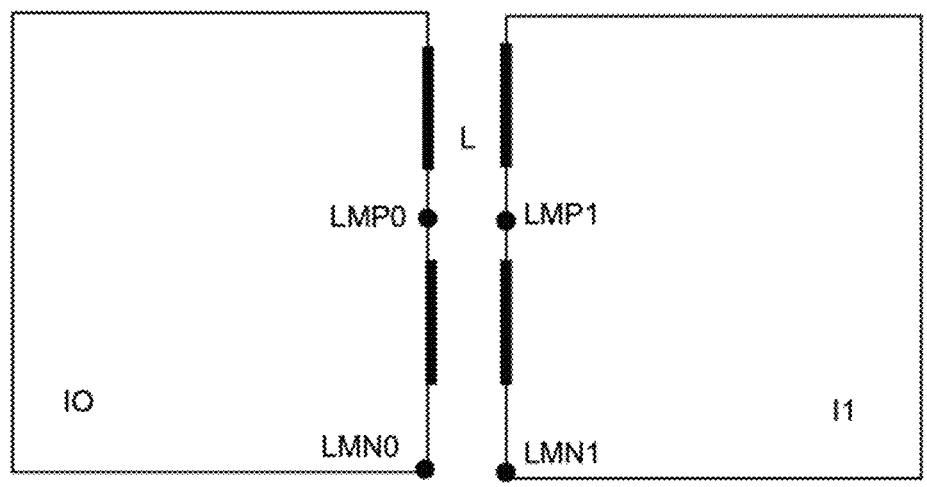

In step 240, pixel values of the detected boundaries are modified. Referring to FIGS. 5A-5C, one denotes a background line on the first boundary B0 as L0, wherein LM0 is the middle point of L0, LMP0 is the middle point between the start of L0 and the end of a previous neighboring background line, LMN0 is the middle point of the end of L0 and the start of a next neighbouring background line, LP0 is the point at a threshold distance TH_LP from the first end of L0 towards the middle of L0, and LN0 is the point at a threshold distance TH_LN from the other end of L0 towards the middle of L0.

One can then define the start point on B0 as LMP0 for the first background line and define the end point on B0 as LMN0 for the last background line.

L1, LM1, LPM1, LNM1, LP1 and LN1 are then defined correspondingly for the second boundary B1.

For each background line, the following operations for each pixel are undertaken:

For a pixel P0 on the first boundary's background line L0 between LP0 and LN0: The HIS difference at P0 and P1 is DIFF=P1−P0. The new HIS value of P0 is P0+DIFF/2, and the new HIS value of its corresponding pixel P1 is P1−DIFF/2.

For a pixel P0 on the first boundary B0 between LMP0 and LP0 (the pixels between LMP0 and LP0 contain both background pixels on L0 and foreground pixels): The HIS difference at LP0 and LP1 (DIFF=LP1−LP0) is used for blending pixels between LMP0 and LP0. The new HIS value of P0 is P0+DIFF/2, and the new HIS value of its corresponding pixel P1 is P1−DIFF/2, For a pixel P0 on the first boundary B0 between LN0 and LMN0 (the pixels between LN0 and LMN0 contain both background pixels on L0 and foreground pixels): The HIS difference at LN0 and LN1 (DIFF=P1−P0) is used for blending pixels between LN0 and LMN0. The new HIS value of P0 is P0+DIFF/2, and the new HIS value of its corresponding pixel P1 is P1−DIFF/2.

The threshold values TH_LP and TH_LN are used because the HIS characteristic of pixels on L between LP and the top end or between LN and the bottom end might be mixed both background information and foreground information. Therefore, they may not be suitable for blending directly. It may be more reliable to use the pixels' DIFF near the middle of L to blend the pixels near the two ends of L.

Next, in step 250, the values of pixels not on a boundary are modified. By way of example, for pixels which are not on the boundary, the new HIS value P_NEW is calculated using the following equation: P_NEW=P_OLD+W*DIFF(P_B), where P_OLD is the original HIS value of a pixel, W is a weighting coefficient, P_B is the nearest pixel on the boundary to this pixel, and DIFF(P_B) is the HIS difference used for blending P_B.

Generally, the larger the absolute value of DIFF(P_B) is, the smaller the value of the weighting coefficient W is.

Figure 6:
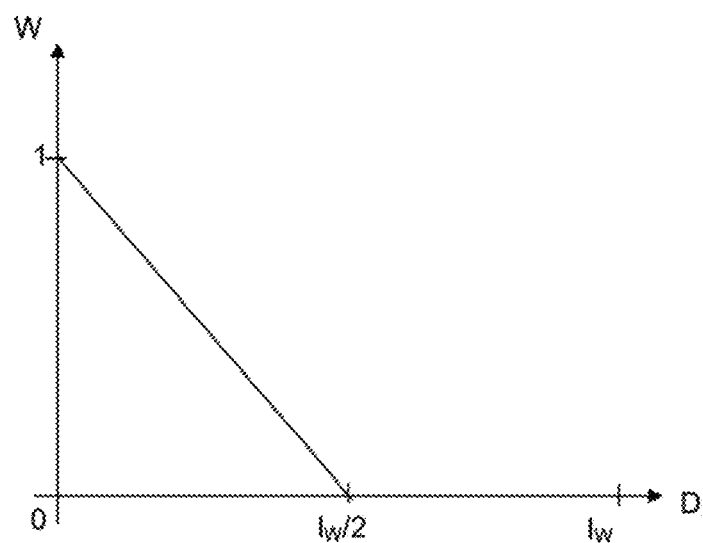
FIG. 6 depicts a graph of the value of a weighting coefficient against distance of a pixel from a boundary between first and second image portions.

By way of example, the value of weighting coefficient W can be defined using a linear equation based on the distance of a pixel from the boundary B (as illustrated in FIG. 6).

It will be understood that where the document content is black and the document background is white, the above equation for calculating a new pixel value would use the difference value of the nearest background pixels on the boundaries to make the "white" area visually flat without seams, "black" areas of document content pixels are modified slightly in the same way with the corresponding background differences.

Figure 7:
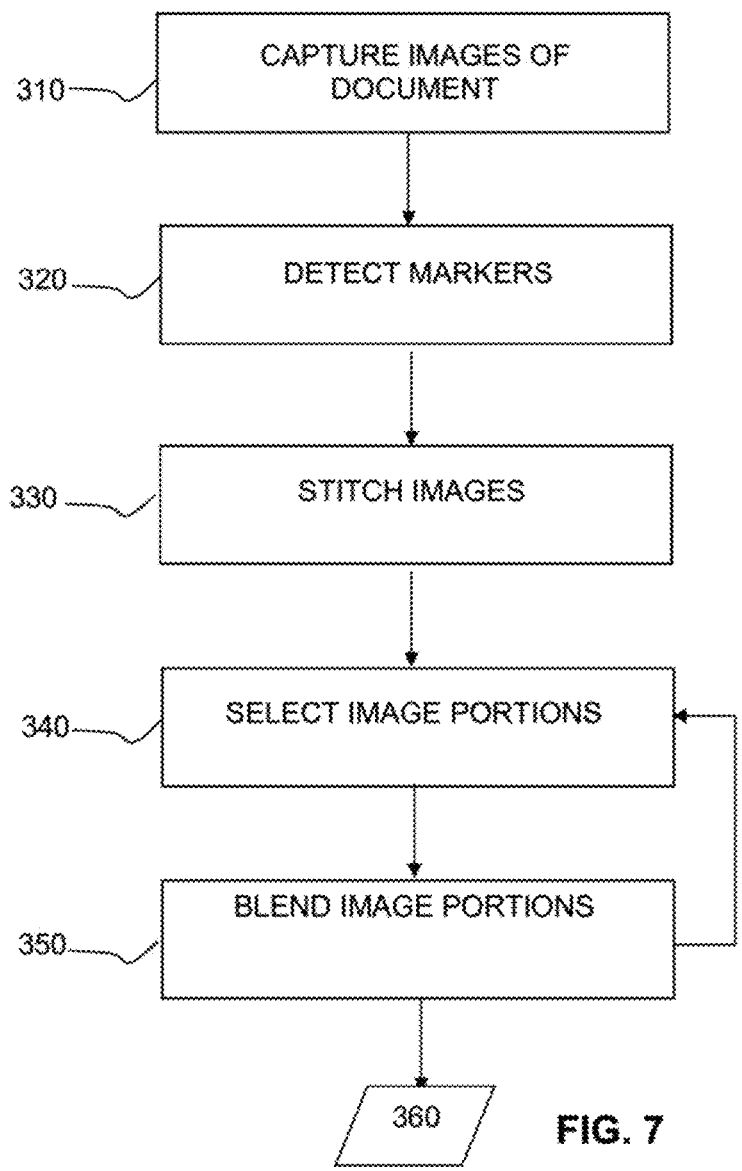
FIG. 7 is a flow diagram of a method of creating a stitched digital image of an A4-sized document according to an embodiment.

By way of demonstrating an exemplary embodiment, a flow diagram of a method of creating a stitched digital image of an A4-sized document is shown in FIG. 7.

Figure 8:
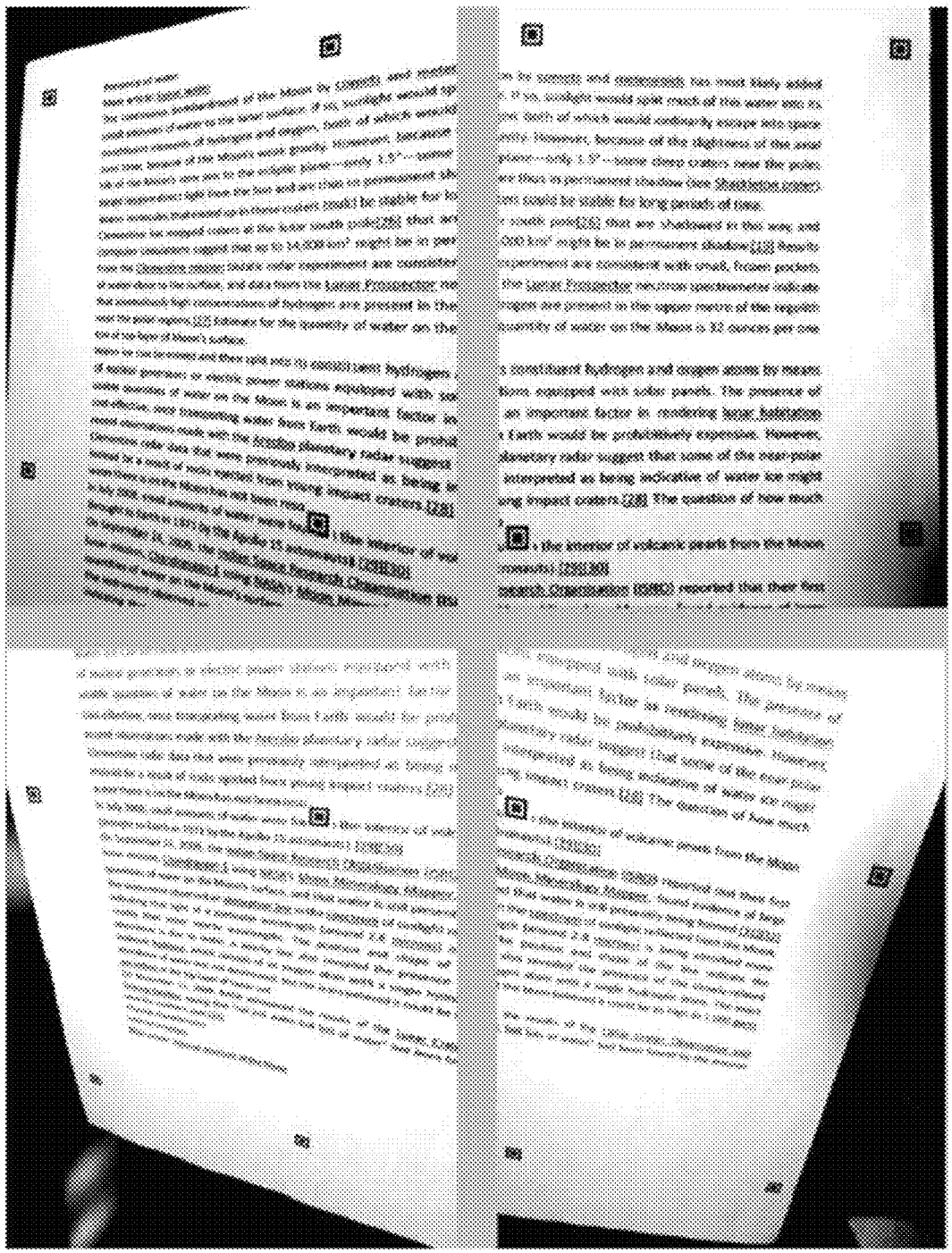
FIG. 8 depicts four captured images of an A4-sized document.

Here, in step 310, a digital camera adapted to tilt and rotate captures the whole of an A4-sized document in four images (as shown in FIG. 8), wherein one image represents approximately one-quarter of the document.

Figure 9:
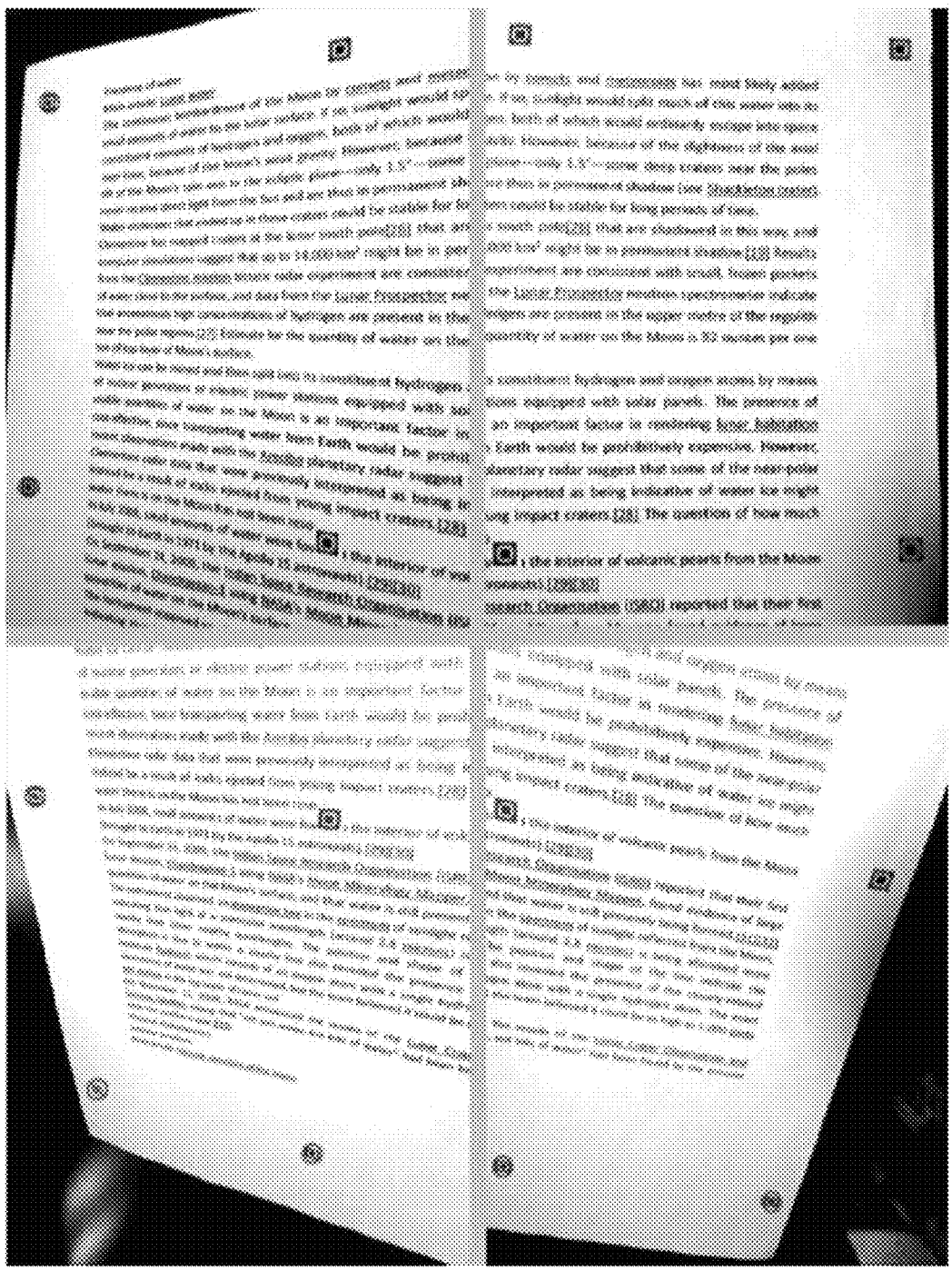
FIG. 9 depicts the provision of square markers at various locations in the A4-sized document captured by the images of FIG. 8.

For improved image distortion detection and registration, square markers are provided at various locations on the document (as shown in FIG. 9). These markers may be strategically positioned in such a way that they indicate the position of central or end axes of the document, for example.

Figure 10:
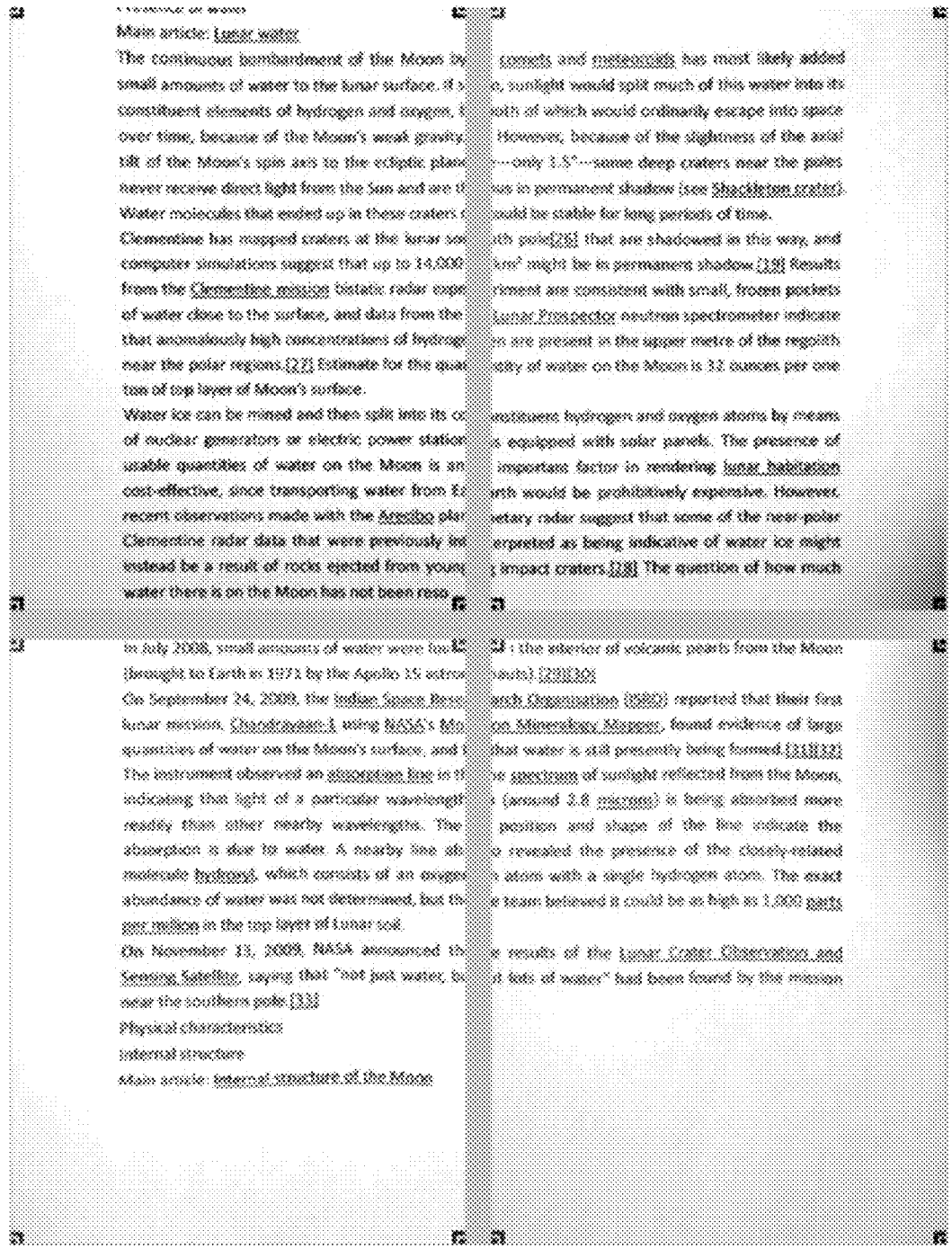
FIG. 10 depicts a digital image created from the four captured images of FIG. 8.

In step 320, the markers are detected using a conventional image recognition technique and then, in step 330, the four captured images are rotated/distorted and stitched together using a conventional image stitching process which takes account of the detected locations of the markers. Thus, a single stitched digital image (as shown in FIG. 10) of the document is provided as a result of step 330, wherein the single stitched digital image comprises four portions corresponding to the four captured images.

Figure 11:
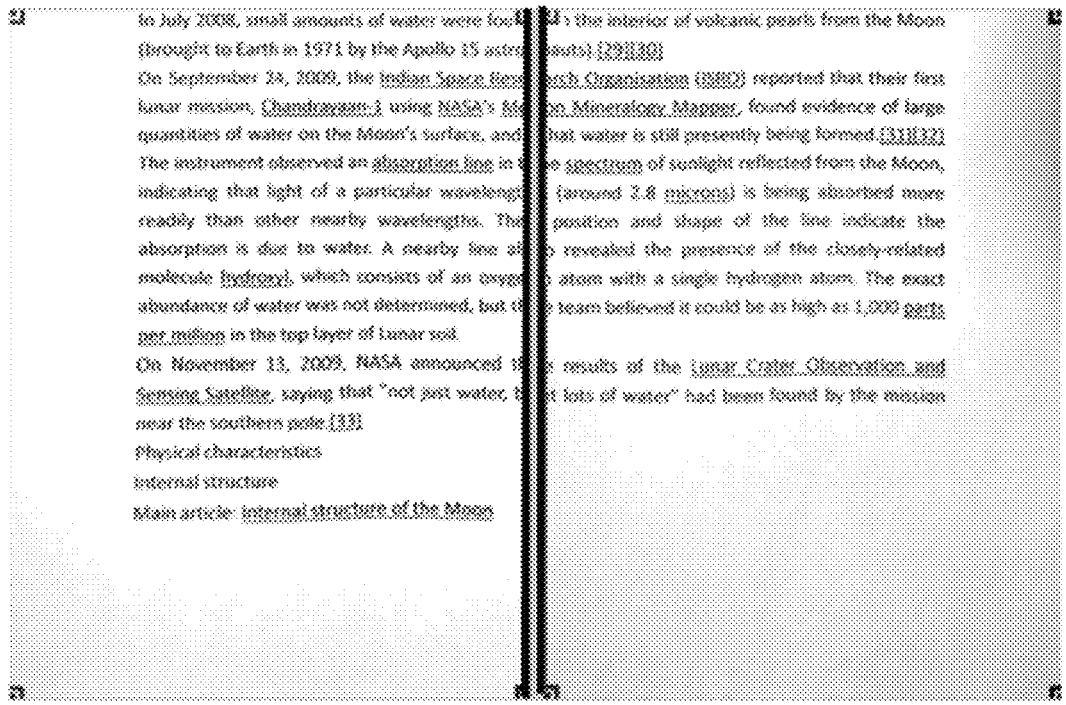
FIG. 11 depicts the detection of boundary lines between first and second image portions of the digital image of FIG. 10.

The stitched digital image is then blended using a system in accordance with that of FIG. 1 for example. Specifically, in step 340, first and second image portions having adjoining edges are selected and provided to a processing unit which then blends the first and second image portions in step 350. Here, the blending process in undertaken in accordance with method described above with reference to FIGS. 2 through 6. An example of the detected boundary between two image portions is shown in FIG. 11.

Thus, the blending process of step 350 reduces or eliminates visually perceivable seams that may exist between the selected image portions. The blended image portions are combined and the process of steps 340 and 350 is repeated until all four image portions have been blended together and a single blended digital image 360 is output.

Figure 12:
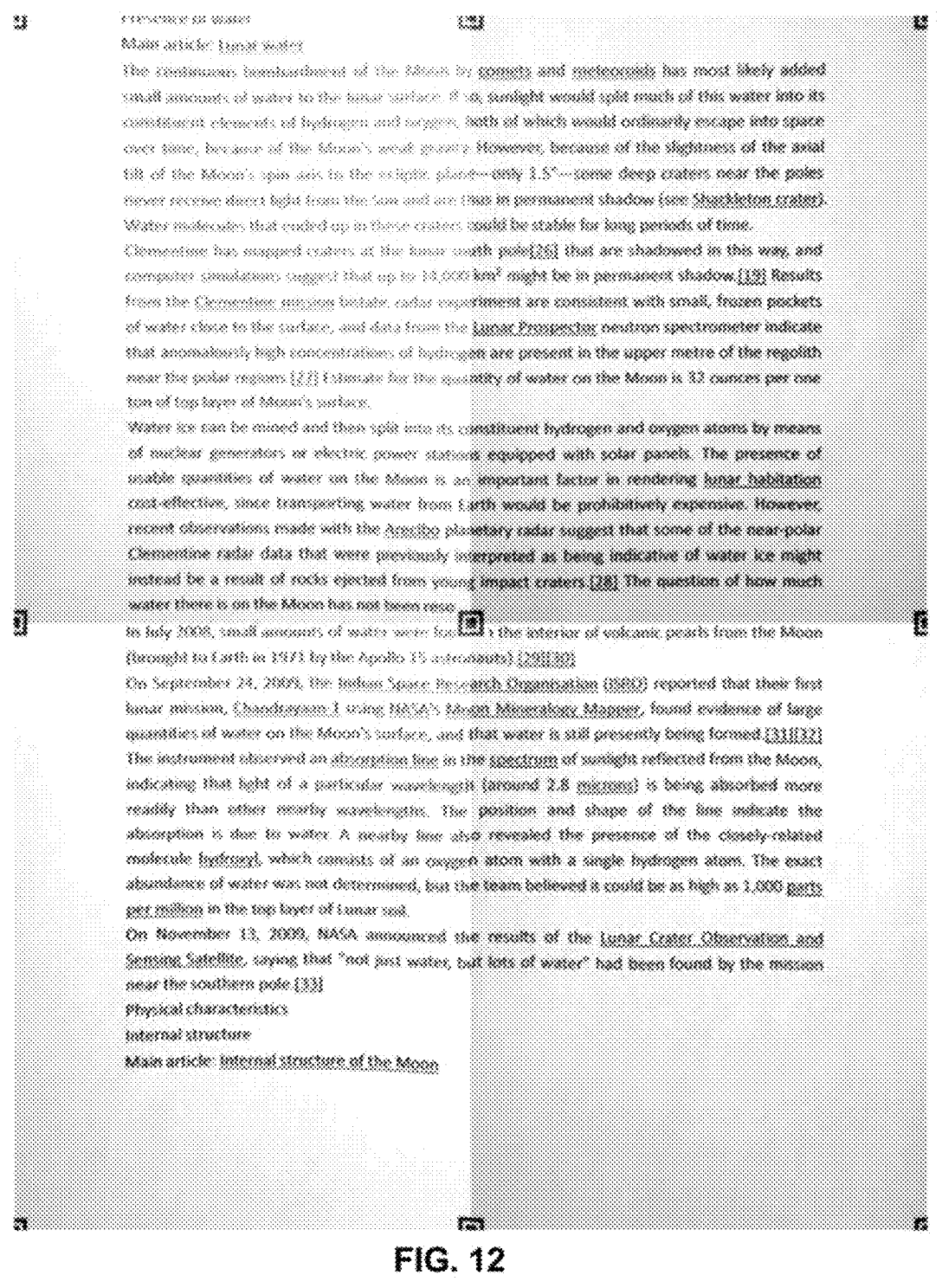
Figure 13:
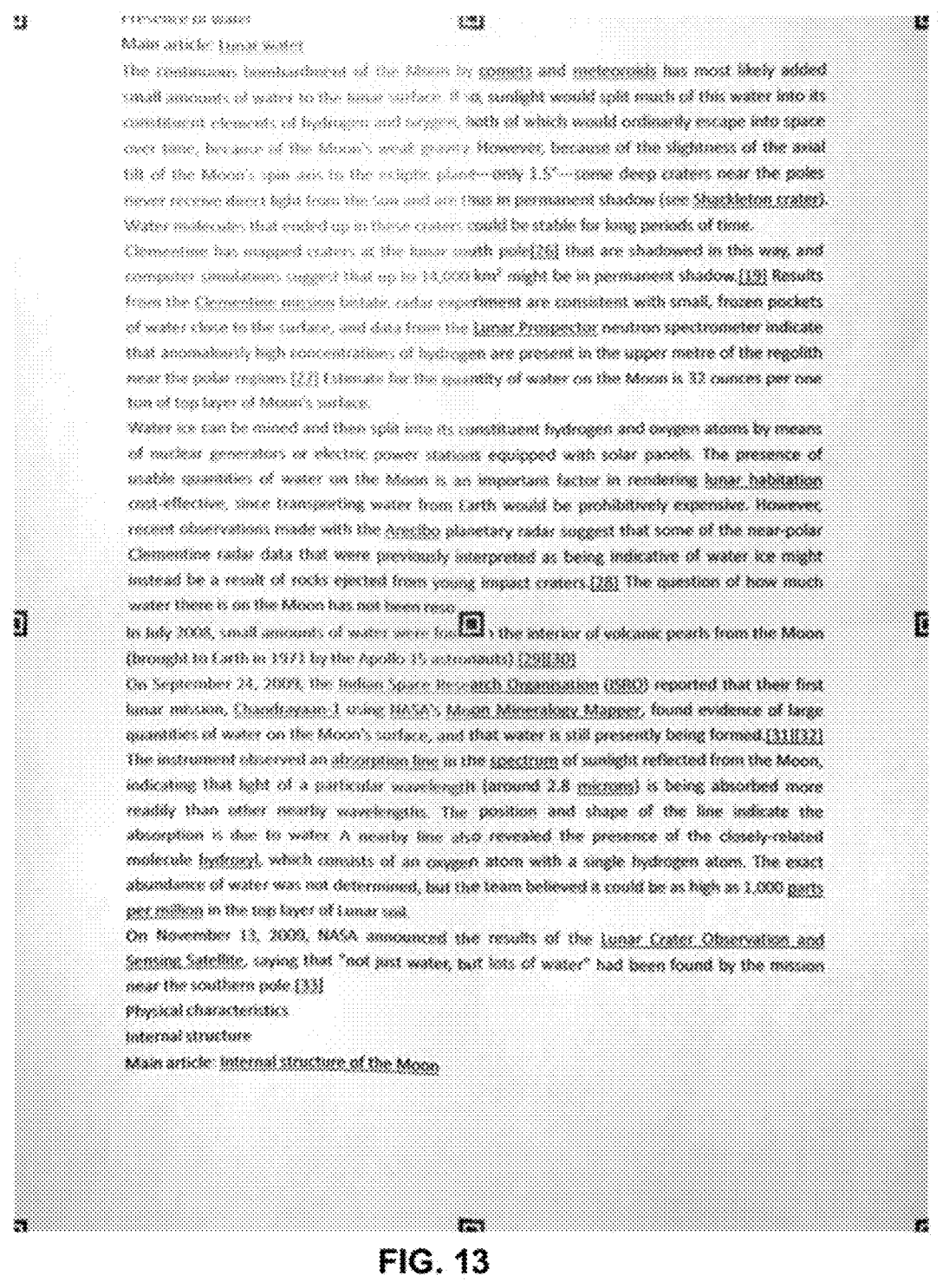

FIGS. 12 and 13 show a stitched image without blending and with blending according to an embodiment, respectively. From FIGS. 12 and 13, it can be seen that a proposed embodiment improves the visual appearance of a stitched digital image of a document by reducing the visual appearance of seams between the stitched image portions.

Embodiments may be captured in a computer program product for execution on the processor of a computer, e.g. a personal computer or a network server, where the computer program product, if executed on the computer, causes the computer to implement the steps of the method, e.g. the steps as shown in FIG. 2. Since implementation of these steps into a computer program product requires routine skill only for a skilled person, such an implementation will not be discussed in further detail for reasons of brevity only.

In an embodiment, the computer program product is stored on a computer-readable medium. Any suitable computer-readable medium, e.g. a CD-ROM, DVD, USB stick, Internet-accessible data repository, and so on, may be considered.

Figure 14:
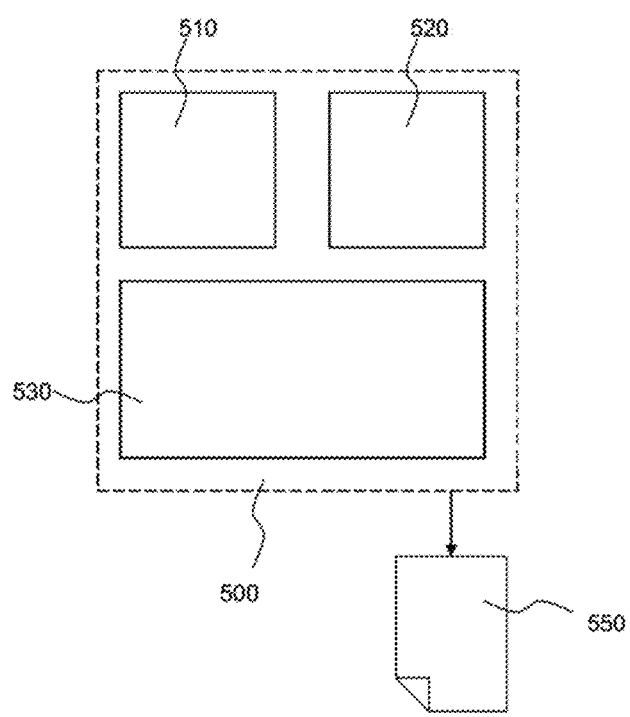
FIG. 14 schematically depicts a system for processing stitched digital images of documents.

In an embodiment, the computer program product may be included in a system for processing stitched digital images of documents, such as a system 500 shown in FIG. 14. The system 500 comprises a user selection module 510, which allows a user to tell the system 500 the stitched digital images he wants the system 500 to blend. The selection may be achieved e.g. by pointing a mouse (not shown) at a digital image of interest.

The system 500 further comprises an image portion selection module 520. The user selection module 510 is responsible for collecting the information of interest to the user, whereas the image portion selection module 520 is responsible for selection image portions of the stitched digital image that the user wants to blend.

In an embodiment, the user selection module 510 and the image portion selection module 520 may be combined into a single module, or may be distributed over two or more modules.

The system 500 further comprises a blending module 530 for blending the selected image portions in accordance with a proposed embodiment and presenting a blended stitched image to the user or subsequent applications in any suitable form, e.g. digitally or in text form, e.g. on a computer screen or as a print-out 550.

It should be noted that the above-mentioned embodiments illustrate rather than limit embodiments, and that those skilled in the art will be able to design many alternative embodiments without departing from the scope of the appended claims. In the claims, any reference signs placed between parentheses shall not be construed as limiting the claim. The word "comprising" does not exclude the presence of elements or steps other than those listed in a claim. The word "a" or "an" preceding an element does not exclude the presence of a plurality of such elements. Embodiments can be implemented by means of hardware comprising several distinct elements. In the device claim enumerating several means, several of these means can be embodied by one and the same item of hardware. The mere fact that certain measures are recited in mutually different dependent claims does not indicate that a combination of these measures cannot be used to advantage.

The invention claimed is:

1. A method of blending first and second portions of a stitched digital image of a document, the method comprising the steps of:
   using a computer, detecting respective overlapping or adjacent boundaries of the first and second portions;
   using a computer, categorizing pixels on each boundary of the first and second portions as either a background pixel or a foreground pixel; and
   using a computer, modifying a pixel of the first or second portion based on a pixel value difference between corresponding background pixels on the respective boundary of the first and second portions, wherein the corresponding background pixels on the respective boundary of the first and second portions are those closest in distance to the pixel being modified.

2. The method of claim 1 wherein the pixel value difference is the HIS difference between corresponding background pixels on the respective boundary of the first and second portions.

3. The method of claim 1, wherein the step of categorizing comprises the step of, using a computer, analyzing the brightness and saturation of neighbouring pixels.

4. The method of claim 3, wherein neighbouring pixels are categorized as background pixels if the brightness of the neighbouring pixels is greater than a first threshold value and the saturation of the neighbouring pixels is less than a second threshold value.

5. The method of claim 1, wherein the step of modifying is further based on the distance of the pixel being modified from a boundary between the first and second portions.

6. The method of claim 1, further comprising the steps of:
   using a computer, modifying pixels at a boundary between the first and second portions using a first blending algorithm; and
   using a computer, modifying pixels not at the boundary using a second blending algorithm, the second blending algorithm being based on the distance of a pixel from the boundary between the first and second portions.

7. The method of claim 1, further comprising the step of, using a computer, detecting a continuous series of background pixels along each boundary of the first and second portions by analyzing the brightness of pairs of corresponding pixels on the respective boundary of the first and second portions.

8. The method of claim 7, further comprising the step of, using a computer, disregarding a detected continuous series of background pixels along each boundary of the first and second portions if the length of the continuous series is less than a predetermined threshold value.

9. A method of creating a stitched digital image of a document, the method comprising the steps of:
using a computer, providing first and second digital image portions, each digital image portion being a digital representation of a portion of the document;
using a computer, stitching the first and second digital image portions together to create a stitched digital image of the document; and
using a computer, blending the first and second digital image portions according to claim 1.

10. A method of blending a stitched digital image of a document, the stitched digital image comprising a plurality of image portions;
using a computer, selecting first and second image portions of the stitched digital image;
using a computer, blending the first and second digital image portions according to claim 1.

11. A computer program product comprising computer program code adapted, when executed on a computer, to cause the computer to implement the steps of:
categorizing pixels on a boundary of first and second portions of a stitched digital image of a document as either a background pixel or a foreground pixel, wherein a background pixel represents an area of the document devoid of document content and a foreground pixel represents an area comprising document content; and
modifying a pixel based on a difference between background pixels on the boundary of the first and second portions wherein the corresponding background pixels on the respective boundary of the first and second portions are those closest in distance to the pixel being modified.

12. A computer-readable medium having computer-executable instructions stored thereon that, if executed by a computer, cause the computer to implement the steps of:
categorizing pixels on a boundary of first and second portions of a stitched digital image of a document as either a background pixel or a foreground pixel, wherein a background pixel represents an area of the document devoid of document content and a foreground pixel represents an area comprising document content; and
modifying a pixel based on a difference between background pixels on the boundary of the first and second portions wherein the pixel value difference is the HIS difference between corresponding background pixels on the respective boundary of the first and second portions.

13. A system comprising a computer and the computer program product of claim 11.

14. The computer program product of claim 11 wherein the pixel value difference is the HIS difference between corresponding background pixels on the respective boundary of the first and second portions.

15. The computer program product of claim 11 wherein the step of categorizing comprises the step of, using a computer, analyzing the brightness and saturation of neighboring pixels.

16. The computer program product of claim 11 wherein the step of modifying is further based on the distance of the pixel being modified from a boundary between the first and second portions.

17. The computer program product of claim 11, further comprising computer program code adapted, when executed on a computer, to cause the computer to implement the steps of:
modifying pixels at a boundary between the first and second portions using a first blending algorithm; and
modifying pixels not at the boundary using a second blending algorithm, the second blending algorithm being based on the distance of a pixel from the boundary between the first and second portions.

18. The computer program product of claim 11 further comprising computer program code adapted, when executed on a computer, to cause the computer to implement the step of:
detecting a continuous series of background pixels along each boundary of the first and second portions by analyzing the brightness of pairs of corresponding pixels on the respective boundary of the first and second portions.

19. The computer readable medium of claim 12 further having computer-executable instructions stored thereon that, if executed by a computer, cause the computer to implement the steps of:
modifying pixels at a boundary between the first and second portions using a first blending algorithm; and
modifying pixels not at the boundary using a second blending algorithm, the second blending algorithm being based on the distance of a pixel from the boundary between the first and second portions.

* * * * *